3,285,853
HYDROCARBONTHIOPHOSPHONATES AND LUBRICANT COMPOSITIONS THEREOF

Roger G. Lacoste, Hopewell Junction, N.Y., assignor to Texaco Inc., New York, N.Y., a corporation of Delaware
No Drawing. Filed Oct. 9, 1963, Ser. No. 314,885
9 Claims. (Cl. 252—46.6)

This invention relates to novel reaction products of dihydroxyepoxyalkanes and hydrocarbonthiophosphonic acids or hydroxyalkyl hydrocarbonthiophosphonates and to lubricant compositions thereof and method of manufacture.

More particularly, the invention pertains to polyhydroxyalkyl and polyhydroxyoxaalkyl polyalkenethiophosphonates of the formula:

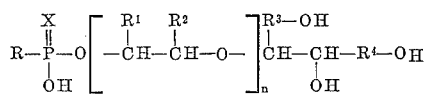

where R is a monovalent polyalkene derived radical, $R^1$ and $R^2$ are radicals selected from the group consisting of hydrogen and saturated aliphatic hydrocarbon (alkyl) of from 1 to 6 carbons, $R^3$ and $R^4$ are alkylene radicals of from 1 to 6 carbons, X is a chalcogen selected from the group consisting of sulfur and a mixture consisting of a major portion of sulfur and a minor portion of oxygen and $n$ is a whole integer of from 0 to 1 inclusively.

The polyhydroxyalkyl and polyhydroxyoxaalkyl polyalkenethiophosphonates of the invention hereafter known as polyhydroxy polyalkenethiophosphonates are useful as detergent and dispersant additives in lubricants and fuels such as mineral oil, synthetic organic ester oil and kerosine jet fuels.

Broadly, the polyhydroxy polyalkenethiophosphonates are formed by reacting a dihydroxyepoxyalkane with a polyalkenethiophosphonic acid or a hydroxyalkyl polyalkenethiophosphonate at an elevated temperature.

*Preparation of the polyalkenethiophosphonic acid and hydroxyalkyl polyalkenethiophosphonate reactants*

The polyalkenethiophosphonic acid and the hydroxyalkyl polyalkenethiophosphonate are described in U.S. 3,087,956 and in co-assigned, copending application Serial No. 63,973, filed October 21, 1960 and now U.S. Patent No. 3,123,630. The polyalkenethiophosphonic acid is prepared by first forming a complex polyalkene-$P_2S_5$ reaction product. As is well known the polyalkene-$P_2S_5$ reaction product is prepared by the reaction of polyalkene with $P_2S_5$ at elevated temperature.

The monoolefinic polyalkene hydrocarbons which react with $P_2S_5$ usually contain at least 12 carbon atoms although a lower molecular weight polyolefin can be employed. Olefin polymers such as polyisobutylene, polybutylene, polypropylene, polyethylene and copolymers of olefins such as propylene-isobutylene copolymers are particularly preferred materials for the reaction with $P_2S_5$. In general, monoolefinic polyalkene polymers and copolymers having an average molecular weight of between about 250 and 50,000 are employed to form the $P_2S_5$-hydrocarbon product with polymers and copolymers having an average molecular weight in the range from about 600 to 5,000 being preferred. A particularly preferred monoolefin polymer is a polybutene having an average molecular weight between about 600 and 5,000. Copolymers of conjugated alkadienes and alkenes such as the copolymer of butadiene and isobutylene of an average molecular weight in the above described range also are desirable reactants with $P_2S_5$.

The polyalkene-$P_2S_5$ reaction product is prepared by contacting $P_2S_5$ with the polyalkene at a temperature from about 100 to 320° C. in a non-oxidizing atmosphere, for example, under a blanket of nitrogen. In the reaction mixture, the $P_2S_5$ constitutes about 6 to 40 wt. percent thereof. The resultant product is then hydrolyzed at a temperature between about 100 and 260° C. by contacting with steam. The steam treatment converts the hydrocarbon-$P_2S_5$ product to a polyalkenethiophosphonic acid and inorganic phosphorus acid. The thiophosphonic acid has the general formula:

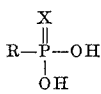

wherein R is polyalkene derived radical from the charged polyalkene used in the manufacture of the polyalkene-$P_2S_5$ reactant. R preferably contains 20 to 200 carbon atoms. X is a sulfur or a mixture consisting of a major portion of sulfur and a minor portion of oxygen.

X in the above formula is designated as sulfur or a mixture of a major portion of sulfur and a minor portion of oxygen because the steam hydrolysis step usually results in the replacement with oxygen of a portion of the sulfur joined to the phosphorus. Referring to the above formula, by the term "X is a major portion of sulfur and a minor portion of oxygen" I intend a product which is a mixture of (A)
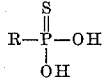

(B)
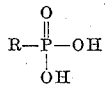

with Product A predominating.

The thus formed thiophosphonic acid is reacted with an alkylene oxide of the formula:

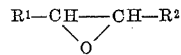

at a temperature between about 60 to 150° C. under a pressure between atmospheric and 500 p.s.i.g. to form the hydroxyalkyl polyalkenethiophosphonate reactant of the formula:

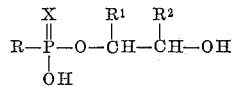

where R, $R^1$, $R^2$ and X are as heretofore defined. Examples of the polyalkenethiophosphonic acid and hydroxyalkyl polyalkenethiophosphonate reactants contemplated herein are polyisobutene(1100 M.W.)thiophosphonic acid, polyethylene(1000 M.W.)thiophosphonic acid, polyhexylene(5000 M.W.)thiophosphonic acid, 2-hydroxyethyl polybutene(940 M.W.)thiophosphonate, 2-hydroxyethyl polybutene(2000 M.W.)thiophosphonate, 1,2 - diethyl-2-hydroxyethyl polypropylene(1500 M.W.) thiophosphonate, and 1-methyl-2-hydroxyethyl polyisopentylene(2500 M.W.)thiophosphonate. I intend by these terms the pure thio material as well as its mixtures with a minor portion of the corresponding phosphonic acid or phosphonate.

*The dihydroxyepoxyalkane reactant*

The dihydroxyepoxyalkane reactant contemplated herein is of the formula:

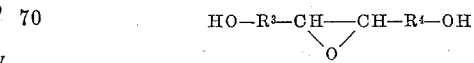

wherein $R^3$ and $R^4$ are alkylene radicals of from 1 to 6 carbons. Specific examples of dihydroxyepoxyalkanes contemplated herein are 1,4-dihydroxy-2,3-epoxybutane, 1,7-dihydroxy-2,3-epoxyheptane, 1,5-dihydroxy-3,4-epoxyhexane and 2,6-dihydroxy-2-methyl-3,4-epoxyheptane.

*Preparation of the polyhydroxy polyalkenethiophosphonates of the invention*

The polyhydroxy polyalkenethiophosphonates of the invention are prepared by contacting the dihydroxyepoxyalkane reactant with a polyalkenethiophosphonic acid or hydroxyalkyl polyalkenethiophosphonate at a temperature between about 25 and 150° C., in a mole ratio of epoxyalkane to thio reactant of between about 0.1:1 and 1:1. The reaction is normally conducted for a period between about 0.5 and 3.0 hours. Desirably, inert organic diluent is used such as dimethyl acetamide, dimethyl formamide and dioxane. When a hydroxyalkyl polyalkenethiophosponate reactant is employed it is preferable to employ acid catalyst in a mole ratio of thiophosphonate reactant:epoxyalkane reactant:catalyst of between about 0.1:1:0.001 to 1:1:0.1. The catalysts contemplated herein are Lewis acids, Lewis acid salts, mineral acids and organic acids. Specific examples are $BF_3 \cdot C_2H_5OC_2H_5$, $BF_3$, $HF$, $AlCl_3$, $SnCl_4$, $TiCl_4$, $ZnCl_2$, $H_2SO_4$, $H_3PO_4$, and $CCl_3CO_2H$.

At the end of the reaction the polyhydroxy polyalkenethiophosphonate product of the invention can be purified by standard means. One means of removing impurities is employing fractional distillation under reduced pressure and elevated temperature utilizing inert gas such as nitrogen to act as the stripping agent.

Specific examples of the polyhydroxy polyalkenethiophosphonates contemplated herein are 1-methylol-2,3-dihydroxypropyl polyisobutene(1100 M.W.)thiophosphonate;

1-propylol-2,3-dihydroxypropyl polypropylene(2000 M.W.)thiophosphonate;

1-methylol-2,3-dihydroxypolyethylene(2000 M.W.)thiophosphonate;

1-(1'-methyl-3'-hydroxypropyl)-2,5-dihydroxypentyl polyhexylene(3500 M.W.)thiophosponate;

4-methylol-5,6-dihydroxy-3-oxahexyl polybutene(1100 M.W.)thiophosponate;

4-methylol-5,9-dihydroxy-3-oxanonyl polyisobutylene 2300 M.W.) thiophosphonate;

2-ethyl-4-(propylol)-5,7-dihydroxy-3-oxaheptyl propylene-butylene copolymer(3000 M.W.)thiophosphonate and 4-(2'-methyl-3'-hydroxypropyl)-5,9-dihydroxy-3-oxadecyl polyhexylene(5000 M.W.)thiophosphonate.

By the foregoing terms I intend the pure thio compound as well as its mixtures with a minor portion of the corresponding phosphonate.

*Lubricant compositions containing the novel polyhydroxy polyalkenethiophosphonates of the invention*

As heretofore stated the polyhydroxythiophosphonates of the invention impart detergent-dispersant properties to lubricating oils. Hydrocarbon mineral oils are usable in the thiophosphonate lubricant composition of the invention. They can be paraffin base, naphthene base, or mixed paraffin-naphthene base distillate or residual oils. Paraffin base distillate lubricating oil fractions which are used in the formulation of premium grade oil are contemplated in the invention. The lubricating bases generally have been subjected to solvent refining to improve their lubricity and viscosity-temperature relationship as well as solvent dewaxing to remove waxy components to improve the pour of the oil. Broadly speaking, mineral lubricating oils having an SUS viscosity at 100° F. between 50 and 1000 may be used in the formulation of the improved lubricants of this invention, but usually the SUS viscosity range falls between 70 and 300 at 100° F.

The mineral lubricating oils containing the polyhydroxythiophosphonates may also contain other additives designed to impart other desirable properties thereto. For example, V.I. improvers such as polymethacrylates are normally included therein as are corrosion inhibitors and other detergents.

A widely used V.I. improver is polymethacrylate of the general formula:

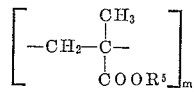

wherein $R^5$ is an aliphatic radical of from 1 to 20 carbons and $m$ is an integer between 600 and 35,000.

Another used supplementary detergent is an alkaline earth metal alkylphenolate. Barium nonylphenolate, barium dodecylcresolate, and calcium dodecylphenolate are examples of such detergents. These products which are well known detergent additives are usually present in the lubricating oil in the concentration between 0.1 and 5 wt. percent.

Still another additive employed is anti-oxidant divalent metal dialkyl dithiophosphates resulting from the neutralization of a $P_2S_5$-alcohol reaction product with a divalent metal or divalent metal oxide. Barium and zinc dialkyl dithiophosphates are the most widely used oxidation and corrosion inhibitors. Metal dialkyl dithiophosphates are usually present in the lubricant at concentrations between 0.1 and 3 wt. percent.

Synthetic lubricating bases of the ester or ether type may also be used as the lubricating base oil. High molecular weight, high boiling aliphatic dicarboxylic acid esters possess excellent viscosity-temperature relationships and lubricating properties and are finding ever-increasing utilization in lubricating oils adapted for high and low temperature lubrication. Esters of these types are used in the formulation of jet engine oils.

The polyhydroxyalkyl polyalkenethiophosphonates of the invention are present in lubricating oils in concentrations sufficient to impart dispersant and detergent properties thereto. In concentrates used in the formulation of the finished lubricants the concentration of the polyhydroxyalkyl polyalkenethiophosphonate can be as high as 50%. In finished lubricants the concentration of the additive falls between 0.2 and 10 wt. percent with a concentration between 1 and 5 wt. percent normally preferred.

The following examples further illustrate the invention but are not to be construed as limitations thereof.

EXAMPLE I

This example illustrates the preparation of the hydrocarbon thiophosphonic acid and thiophosphonate reactants.

A polyisobutenethiophosphonic acid of the formula:

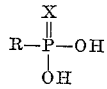

wherein R is a polyisobutene radical of an average molecular weight of about 1100 and X is a mixture of a major portion of sulfur and a minor portion of oxygen was prepared by contacting polyisobutene (1100 M.W.) with $P_2S_5$ in a mole ratio of polyisobutene to $P_2S_5$ of 1.1:1 and in the presence of sulfur an amount of 3 wt. percent based on the polyisobutene. The reaction mixture was maintained at 232° C. until said mixture was soluble in n-pentane. The mixture was then diluted with approximately 150 wt. percent of a naphthene base oil having an SUS viscosity at 100° F. of 100, steamed at 176° C. for 10 hours in a nitrogen atmosphere and then dried by the passage of nitrogen therethrough at 150° C. The steamed product was extracted with 50% by volume methanol at 60° C. to give a methanol extract containing inorganic phosphorus acids and a lubricating oil raffinate containing polybutenethiophosphonic acid of the formula:

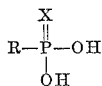

where R is a polyisobutene derived radical of an average molecular weight of about 1100. The raffinate after being stripped free of methanol at a temperature of 176° C. at atmospheric pressure had a Neut. No. (neutralization number) of 17.0. Sulfur analysis of the thiophosphonic acid found it to have a sulfur content of 0.63 wt. percent. The theoretical sulfur content for

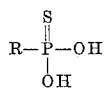

is 0.99 wt. percent indicating that X is a mixture of a major portion of sulfur and a minor portion of oxygen.

A portion of the oil raffinate prepared above in the amount of 7000 grams containing 2.15 moles polyisobutene (1100 M.W.) thiophosphonic acid was charged to a 12-liter 3-necked flask equipped with stirrer, gas inlet tube extending below the surface of the acid reactant, a thermometer immersed in the acid, and a water-cooled reflux condenser. The acid was heated to 121° C. with stirring over a 1 hour period and nitrogen blowing. Ethylene oxide was then passed through a trap in which it was mixed with nitrogen and introduced into the reaction flask at the rate so as to maintain a gentle reflux with ethylene oxide. When ethylene oxide was no longer taken up, as evidenced by the increase in the reflux rate its addition was stopped. The excess ethylene oxide in the reaction mixture was allowed to reflux for 1 hour. At the end of this period, ethylene oxide remaining in the reaction flask was expelled therefrom by passing nitrogen through the reaction mixture for 1.5 hours. The excess ethylene oxide was recovered in a Dry Ice-acetone trap attached to the outlet of the reflux condenser. Upon cooling of the reaction mixture there was obtained a reaction product which was shown by analysis to consist of an oil solution of 2-hydroxyethyl polyisobutene (1100 M.W.) thiophosphonate of the formula:

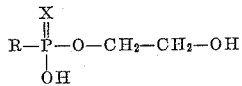

where R is a polyisobutene radical of an average molecular weight of 1100 and X consists of a mixture of a major portion of sulfur and a minor portion of oxygen. Analysis of the product gave the following results:

| Description | Calculated | Found |
|---|---|---|
| Neut. No | 0.0 | 0.35 |
| Hydroxyl No | 17 | 18 |
| Phosphorus, weight percent | 0.94 | 0.84 |
| Sulfur, weight percent | ¹ 0.96 | 0.62 |

¹ Assuming X is 100% sulfur.

EXAMPLE II

This example illustrates the preparation of the product of the invention.

To a 1-liter flask fitted with a glass stirrer, dropping funnel, thermocouple, thermometer and condenser, there was placed 248 grams of an oil solution of the type prepared in Example I containing 0.1 mole of polyisobutene (1100 M.W.) thiophosphonic acid. The oil-containing acid solution was heated to 93° C. and there was added dropwise 13 grams (0.1 mole) of 1,4-dihydroxy-2,3-epoxybutane dissolved in 25 milliliters of dimethyl acetamide. The resultant mixture was stirred and heated at 93° C. for 2 hours. At the end of the 2-hour period an additional 6 grams of 1,4-dihydroxy-2,3-epoxybutane in 10 milliliters of dimethyl acetamide was added and the mixture was heated for two additional hours. At the end of the second 2-hour period an additional 7 grams of said epoxybutane in 15 milliliters of dimethyl acetamide was added and the mixture was heated for a further period of 2 hours. The final reaction mixture was stripped at 100° C. under 1–2 mm./Hg pressure and the residue was passed through a Buchner filter for clarification. The product was identified as 1-methylol-2,3-dihydroxypropyl polyisobutene (1100 M.W.) thiophosphonate of the formula:

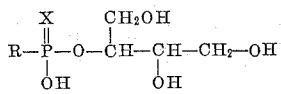

where R is a polyisobutene derived radical of a molecular weight of about 1100 and X consists of a major portion of sulfur and a minor portion of oxygen. Analysis of the thiophosphonate product based on the oil solution found the following on a rounded-off figure basis:

| Description | Calculated | Found |
|---|---|---|
| Phosphorus, weight percent | 1 | 0.9 |
| Sulfur, weight percent | 1 | 0.5 |
| Hydroxyl No | 112 | 115 |
| Neut. No | 0 | 2 |

EXAMPLE III

This example further illustrates the preparation of the product of the invention.

In a 1-liter flask fitted with a glass stirrer, dropping funnel, thermocouple, and condenser was placed 272 grams of an oil solution of (0.1 mole) hydroxyethyl polyisobutene (1100 M.W) thiophosphonate (Neut. No.=1.1; hydroxyl No.=30; wt. percent P=1.1; wt. percent S=0.69) and 1.4 grams (0.01 mole) boron trifluoride etherate. The resulting mixture was heated to 93° C. To the reaction mixture was added dropwise 13 grams (0.1 mole) 1,4-dihydroxy-2,3-epoxybutane dissolved in 25 mls. dimethyl acetamide. Following the addition, the reaction mixture was heated two hours at 93° C. then stripped to 100° C./1–2 mm. Hg pressure. The residual product was identified as an oil solution of 4-methylol-5,6-dihydroxy-3-oxahexyl polyisobutene (1100 M.W.) thiophosphonate of the formula:

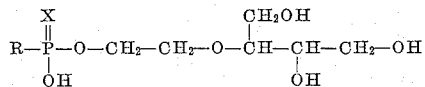

where R is a polyisobutene derived radical of a molecular weight of about 1100 and X consists of a major portion of sulfur and a minor portion of oxygen. Analysis of the thiophosphonate product based on the oil solution found the following on a rounded-off figure basis:

| Description | Calculated | Found |
|---|---|---|
| Neut. No | 0 | 1 |
| Hydroxyl No | 59 | 66 |
| Phosphorus, weight percent | 1 | 1 |
| Sulfur, weight percent | 1 | 0.5 |

EXAMPLE IV

This example illustrates the lubricant composition of the invention and the outstanding detergent-dispersant properties of the thiophosphonates of the invention utilizing the well-known CLR Engine Sludge Test.

A description of an SAE 10W–30 motor oil containing an oil solution of 1-methylol-2,3-dihydroxypropyl polybutene(1100 M.W.)thiophosphonate of Example II (Composition A) and the CLR test results are reported below. For comparison a blank was also tested. The blank was essentially identical to Composition A except it did not contain the thiophosphonate additive.

COMPOSITION A

| Description: | Concentration, wt. percent |
|---|---|
| Refined paraffinic distillate oil (SUS visc. at 100° F.=100) | 89.55 |
| 1 - methylol - 2,3-dihydroxypropyl polybutene (1100 M.W.)-thiophosphonate | 3.18 |
| Barium $C_{12}$ alkylphenolate | 1.80 |
| Zinc isopropyl 1,3-dimethylbutyl dithiophosphate | 0.89 |
| ($CO_2$ neutralized) basic barium sulfonate | 0.58 |
| Mineral oil concentrate containing 25 wt. percent of a copolymer of mixed methacrylate alkyl esters in which the alkyl groups range from butyl to octadecyl | 4.00 |
| Dimethylsilicone anti-foam concentrate, 150 p.p.m. | |

Analysis of the above Composition A found it to have an SUS viscosity at 100° F. of 314 and at 210° F. of 60.3, viscosity index of 132, a pour point of −40° F.

CLR SLUDGE TEST

| Hours | 38 | 54 | 70 | 94 | 110 |
|---|---|---|---|---|---|
| Sludge Rating Composition A | | 9.3 | 9.1 | 7.4 | 6.7 |
| Sludge Rating Blank | 6.9 | 5.4 | | | |

10=Clean Oil Sludge Rating.

As can be seen from above the oil containing the thiophosphonate of the invention took about 110 hours to accumulate the amount of sludge the blank accumulated in 38 hours.

I claim:

1. A product selected from the group consisting of polyhydroxy polyalkenethiophosphonate and a mixture of a major portion of polyhydroxy polyalkenethiophosphonate and a minor portion of the corresponding polyhydroxy polyalkenephosphonate, said polyhydroxy polyalkenethiophosphonate of the formula:

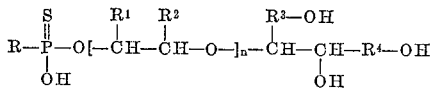

where R is a polyalkene derived radical having an average molecular weight of between about 250 and 50,000 $R^1$ and $R^2$ are radicals selected from the group consisting of hydrogen and alkyl of 1 to 6 carbons, $R^3$ and $R^4$ are alkylene radicals of 1 to 6 carbons, and $n$ is a whole integer of from 0 to 1 inclusively.

2. A product in accordance with claim 1 where R is a polybutene radical and said product is said mixture.

3. A product in accordance with claim 2 where R has an average molecular weight of 1100, $R^3$ and $R^4$ are methylene and $n$ is 0.

4. A product in accordance with claim 2 where R has an average molecular weight of 1100 $R^1$ and $R^2$ are hydrogen, $R^3$ and $R^4$ are methylene, and $n$ is 1.

5. A lubricating oil composition comprising a lubricating base oil and between 0.2 and 10 wt. percent of a product selected from the group consisting of polyhydroxy polyalkenethiophosphonate and a mixture of a major portion of polyhydroxy polyalkenethiophosphonate and a minor portion of the corresponding polyhydroxy polyalkenephosphonate, said polyhydroxy polyalkene thiophosphonate of the formula:

$$R-\overset{S}{\underset{OH}{\overset{\|}{P}}}-O[-\overset{R^1}{\underset{}{CH}}-\overset{R^2}{\underset{}{CH}}-O-]_n-\overset{R^3-OH}{\underset{OH}{CH}}-CH-R^4-OH$$

where R is a polyalkene derived radical having an average molecular weight of between about 250 and 50,000, $R^1$ and $R^2$ are radicals selected from the group consisting of hydrogen and alkyl of from 1 to 6 carbons, $R^3$ and $R^4$ are alkylene radicals of from 1 to 6 carbons and $n$ is a whole integer of from 0 to 1 inclusively.

6. A lubricating oil composition in accordance with claim 5 where R is a polybutene radical and said product is said mixture.

7. A lubricating oil composition in accordance with claim 6 where R has an average molecular weight of about 1100, $R^3$ and $R^4$ are methylene and $n$ is 0.

8. A lubricating oil composition in accordance with claim 7 where R has an average molecular weight of about 1100, $R^1$ and $R^2$ are hydrogen, $R^3$ and $R^4$ are methylene, and $n$ is 1.

9. A lubricating oil composition in accordance with claim 5 wherein said lubricating base oil is a mineral lubricating oil having an SUS viscosity at 100° F. between 50 and 1000.

References Cited by the Examiner

UNITED STATES PATENTS

| | | | |
|---|---|---|---|
| 3,123,630 | 3/1964 | Oberender et al. | 252—46.6 |
| 3,141,901 | 7/1964 | Petersen et al. | 260—953 |
| 3,158,641 | 11/1964 | Reed et al. | 260—953 |
| 3,162,667 | 12/1964 | Reed et al. | 260—953 |
| 3,162,671 | 12/1964 | Petersen et al. | 252—46.6 |
| 3,201,438 | 8/1965 | Reed | 260—953 |
| 3,201,440 | 8/1965 | Reed et al. | 260—953 |

FOREIGN PATENTS 838,928  6/1960  Great Britain.

DANIEL E. WYMAN, *Primary Examiner.*

L. G. XIARHOS, *Assistant Examiner.*